Patented July 2, 1935

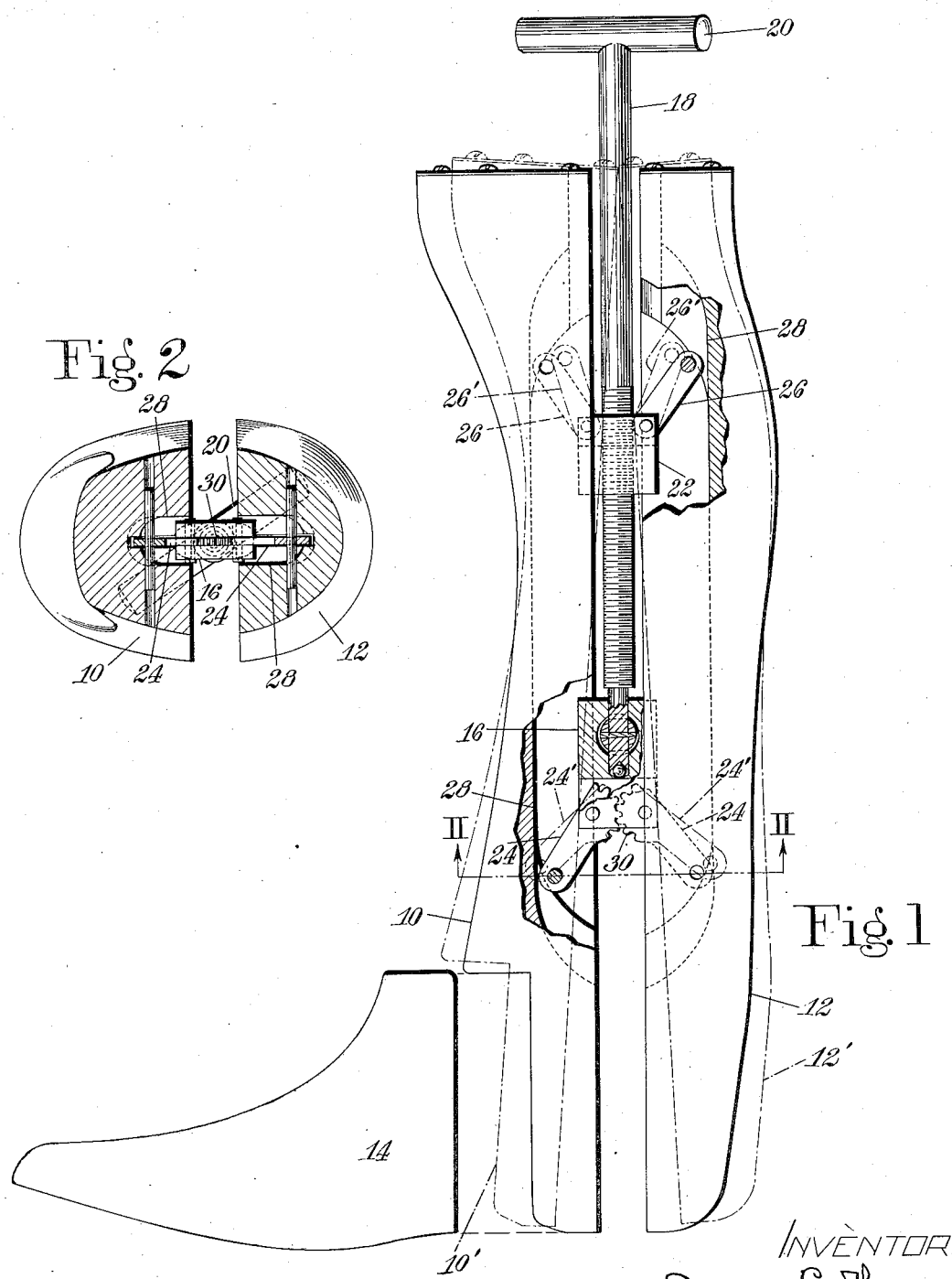

2,006,419

UNITED STATES PATENT OFFICE 2,006,419

BOOT-TREE

George C. Thomas, Swampscott, Mass., assignor to United Last Company, Portland, Maine, a corporation of Maine Application April 21, 1933, Serial No. 667,241
In Great Britain April 26, 1932

4 Claims. (Cl. 12—116)

The present invention relates to boot-trees, and is illustrated as embodied in a tree for high riding boots.

Such boots are close fitting and require accurate treeing each time they are worn, if they are to preserve their shape. For the best results, it has always been regarded as necessary that such boots should be treed on trees made especially to fit them, and such trees are expensive. Further, they fail to fit satisfactorily after the boot has been stretched a little in use.

The object of the present invention is to provide a tree which will give satisfactory results with boots of reasonable variation in style and after substantial wear. Accordingly, I have provided a tree comprising front and rear leg portions, separable from each other, preferably, and as illustrated herein, by a toggle mechanism, the separating mechanism being so arranged as to permit relative rocking of the leg portions in a forwardly and rearwardly extending vertical plane to enable them to fit the boot better throughout its length, and also so arranged as to prevent the relative up-and-down movement between the leg parts which has vitiated the usefulness of prior constructions having the flexibility mentioned. In the illustrated construction a pair of toggle links are provided with interengaging teeth which compel them at all times to assume equiangular positions relatively to the axis of the tree leg.

These and other features of the invention comprising certain combinations and arrangements of parts will be apparent from the following description of a preferred embodiment of the invention shown in the drawing, in which Fig. 1 is a side elevation partly broken away; and Fig. 2 is a horizontal cross-section on the line II—II of Fig. 1.

The illustrated tree consists of three portions, a front leg portion 10, a rear leg portion 12, and a foot portion 14. The first two are connected by the toggle mechanism to be described and the foot portion is not connected to either of these. It is contemplated that the foot portion 14 will be inserted by itself, and the leg portions dropped in behind it and expanded by the toggle mechanism.

The toggle mechanism comprises a block 16, which serves as a step bearing for a screw 18 having a handle 20. The screw 18 is threaded through a second block 22. The blocks 16, 22 are slit at their lower and upper ends, respectively, and each carries a pair of toggle links 24, 26, respectively. These links are pivoted in their blocks and one of each pair is pivoted to the portion 10 and the other of each pair to the portion 12. The links 24 diverge downwardly from the block 16 and the links 26 diverge upwardly from the link 22. The blocks 16, 22 are both guided in slots 28 formed in the leg portions of the tree so that they slide freely but cannot turn. The links 24 are provided with intermeshing gear teeth 30.

When the screw 18 is turned to separate the leg portions the blocks 16, 22 are forced farther apart and each pair of toggle links tends to move into collinearity, but neither pair is forced to take any definite position. With any given setting of the screw 18, the leg portions 10, 12 and the toggles can take a variety of positions. In Fig. 1 they are shown in a central position in full lines, and rocked into one extreme position, with their upper ends together, in dot-and-dash lines, indicated by primed numerals on all the parts concerned. Thus a rocking movement in a forwardly and rearwardly extending vertical plane is permitted to the leg portions, whereby they are enabled to fit the boot leg better throughout its length. The gearing at 30, however, prevents any relative up-and-down movement between the leg portions, and avoids any misshaping of the boot leg due to failure to preserve their alinement.

Having described my invention, what I claim as new and desire to secure by Letters Patent of the United States is:

1. A boot-tree having front and rear leg portions, and an expanding mechanism comprising two pairs of toggle links connecting the leg portions and mechanism compelling a pair of the toggle links in all adjusted positions to maintain substantially equal angles with the vertical axis of the tree leg.

2. A boot-tree having front and rear leg portions, and an expanding mechanism comprising a pair of toggle links connecting the leg portions, and toothed gearing between the toggle links to effect equal angular movements of said links throughout their range of movement when expanding the tree leg.

3. A boot-tree having front and rear leg portions, and an expanding mechanism comprising two pairs of toggle links connecting the leg portions and diverging in opposite directions, the toggle links of one of the pairs having inter-engaging toothed gearing to effect equal angular movements of said links when expanding the tree leg.

4. A boot-tree having front and rear leg portions, and an expanding mechanism comprising two pairs of toggle links connecting the leg portions and screw and nut mechanism, and toothed gearing between the toggle links of one of the pairs to effect equal angular movements of said links when expanding the tree leg.

GEORGE C. THOMAS.